United States Patent Office 2,744,117
Patented May 1, 1956

2,744,117

PROCESS FOR PREPARING THE CHOLINE ESTER OF UROCANIC ACID

Vittorio Erspamer, Alberto Vercellone, and Claudio Pasini, Milan, Italy, assignors to Farmaceutici Italia S. A., a corporation of Italy No Drawing. Application March 31, 1953, Serial No. 346,046

Claims priority, application Italy April 12, 1952

4 Claims. (Cl. 260—309)

It is the object of the present invention to provide a new substance with powerful action upon the respiratory centre, which it excites strongly if administered in very small doses, so as to succeed in resolving almost instantaneously very high grade (even paralytic) states of respiratory depression, as raised, e. g., by the action of morphine or barbituric compounds. In comparatively much heavier doses instead it causes short-lasting curare-like effects, so that it can be employed in therapy as a curare-simile.

The new substance according to the invention may be considered as a product of esterification between β-imidoazolyl-4(5))acrylic (or urocanic) acid and the alcoholic hydroxyl of the ion β-hydroxy-ethyl trimethyl-ammonium (or choline).

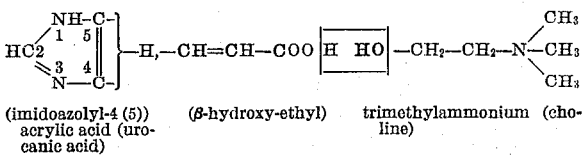

(imidoazolyl-4 (5)) acrylic acid (urocanic acid)  (β-hydroxy-ethyl)  trimethylammonium (choline)

(The formula of urocanic acid, as written above, takes into account the ambiguity of the bond of the imidoazolic nucleus to the remainder of the molecule; hereinafter, the imidoazolic nucleus will be represented bound in position 4, for the sake of simplicity, the said ambiguity being understood).

The substance according to the invention, which, therefore, may be called urocanyl-choline, has already been extracted from the hypobronchial glands of some muricidae and studied as for its biological properties, but not previously identified nor synthesized.

The term "murexine," used in this specification and in the appended claims, is to mean the base urocanylcholine as defined above.

It is in fact a di-acid base in that it possesses a quaternary ammonium function (that of the choline-side, which is strongly basic) and an imidoazolic function (that of urocanic acid, much less basic) and, therefore, it can be obtained as a salt with one as well as with two equivalents of acid radical. In the first case, its formula of structure corresponds to the following:

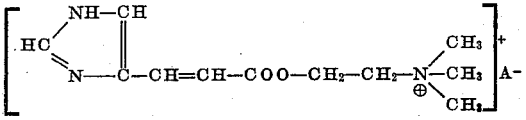

In the second case, it may be written in one of the two following ways:

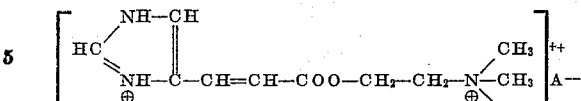

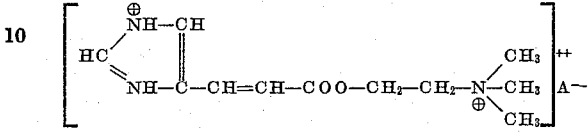

In the formulae written above, A⁻, A⁻⁻ mean the radical of an inorganic acid (such as hydrohalogenic acids, sulfuric, nitric, etc), e. g., Cl⁻, 2Cl⁻, or of an organic acid (picric, styphnic, picrolonic, etc.), e. g.

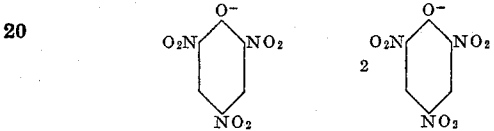

(for therapeutic use, of course, only the radicals of such acids will be concerned which are physiologically tolerated by man in the minimum doses in which the base is active.)

It is also an object of the present invention to provide a process for obtaining murexine by synthesis.

This process is characterized in that the 2-chloroethyl ester of α-chloro-β (imidoazolyl-4(5)) propionic acid (I), is treated under suitable conditions with trimethylamine (II), attaining with the same reactant the double object of forming the cholinic portion and of building the double α-β bond, which is characteristic of urocanic acid, according to the following reaction scheme:

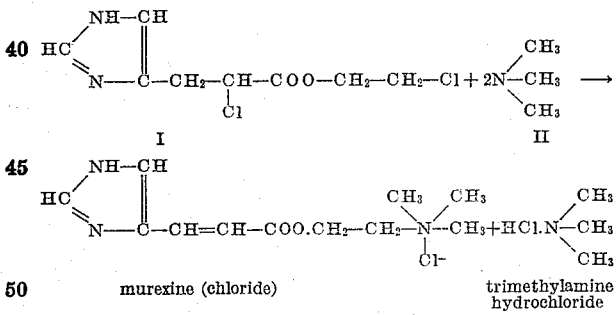

murexine (chloride)                  trimethylamine hydrochloride

The reaction written above is particularly interesting because it eliminates the passage from α-chloro-β imidoazolylpropionic acid to urocanic acid with consequent considerable lowering of yields; it avoids the necessity of operating on urocanic acid, which is not easy to be esterified; and it can be carried out in a neutral medium, which is a condition of fundamental importance since murexine is very labile in alkaline media and little stable also in acid media.

The 2-chloroethyl ester of α-chloro-β (imidoazolyl-4(5)) propionic acid is obtained in a quite normal manner by treating this acid under reflux in an excess of ethylene chlorohydrin saturated with HCl.

Said acid in turn can be obtained from histidine following methods described in literature.

As will be mentioned in the examples, it is preferable to obtain from the reaction mixtures the murexine as a dipicrate, which is a well crystallizing salt easy to be purified.

From the aqueous solutions of their picrates, the bases are set free as usual by acidifying strongly with HCl, extracting continuously, with an immiscible solvent the picric acid, evaporating the aqueous solution and purifying with conventional methods.

This process requires much time and, in the specific case, it is definitely ruinous as for result, owing to the low stability of murexine in acid media.

Therefore, a simple and rapid process has been found, which is carried out in a neutral medium, whereby the murexine dipicrate is transformed into a chloride-hydrochloride with a yield of 90%; this process is also part of the present invention and consists in a reaction of double exchange carried out in boiling water between murexine dipicrate and the hydrochloride of a cationic detergent (e. g., the di-hydrochloride of 2,4-diguanidine-phenyl-lauryl ether) with formation of the dipicrate of the latter, substantially insoluble in water, according to the following reaction scheme:

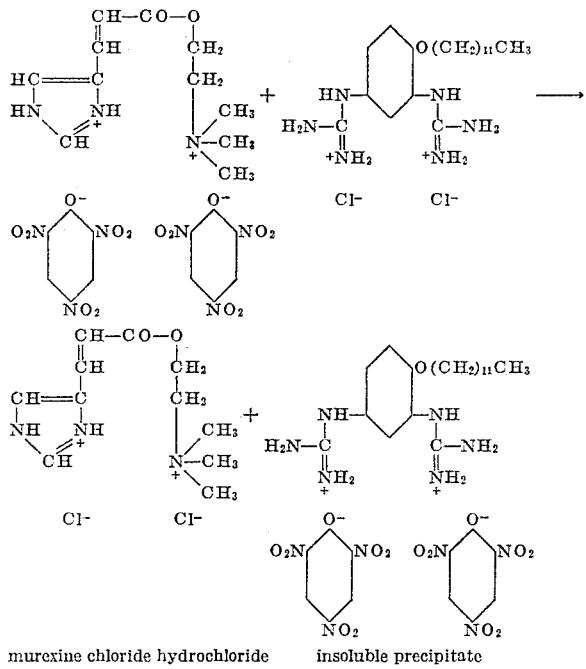

murexine chloride hydrochloride    insoluble precipitate

The following is an illustrative example without limitation.

10 g. of α-chloro-β(imidoazolyl-4(5))propionic acid are treated under reflux for three hours in 50 g. of ethylene chlorohydrin saturated with HCl. The excess chlorohydrin is eliminated by distillation under vacuo: water is added; the pH is made alkaline and rapid extraction with ether or benzene is effected four or five times. Careful washing with water and drying over anhydrous Na2SO4 follows. By evaporating the solvent at reduced pressure, about 7 g. of 2-chloroethyl ester of α-chloro-β(imidoazolyl-4(5))propionic acid are obtained (this compound, specially under conditions of absolute dryness, decomposes hydrolytically).

7 g. of 2-chloroethyl ester of α-chloro-β(imidoazolyl-4(5))propionic acid, obtained as described, are dissolved in 100 cc. of anhydrous acetone, cooled to —10°/—15° C., additioned with 14 cc. of liquid trimethylamine, this too cooled, and poured rapidly into a cylinder of about 300 cc. capacity provided with a pressure gauge. The cylinder is then kept at 85°–90° and under agitation for 40 hours (under these conditions, pressure remains at about 4 atmospheres) then it is opened while it is not yet cooled down completely. The acetonic liquid is poured into a flask and stoppered; a white crystalline substance separates therefrom, which is filtered, re-dissolved in anhydrous alcohol, re-precipitated with acetone and filtered again; it is extremely hygroscopic; if dried over P2O5 at 56° C. and under vacuum, on analysis it shows to be murexine chloride monohydrate. With a saturated solution of picric acid it gives regularly murexine dipicrate, M. P. 221–222° with decomposition.

To the walls of the cylinder there adheres a sticky substance partly crystalline, which is dissolved in water, treated with a little decolorizing carbon, filtered and poured under agitation into a solution, saturated in the cold and subsequently heated, of picric acid.

An orange-yellow precipitate is obtained, which is re-crystallized two or three times from boiling water with the addition of small quantities of decolorizing carbon.

Thus again murexine is obtained in the form of dipicrate, orange-yellow needles, M. P. 221–222° C.

The chloride hydrochloride of murexine, more suitable for therapeutic use, is obtained from the dipicrate in the following way:

To a hot solution of 3.36 g. of 2,4-diguanidine-phenyl-lauryl ether di-hydrochloride, in 100 cc. of preferably bi-distilled water, there is added little by little and under agitation a boiling saturated solution prepared with 4.77 g. of murexine dipicrate, this too is preferably bi-distilled water. A flocculent precipitate of 2,4-diguanidine-phenyl-lauryl ether dipicrate is formed at once. It is allowed to cool down and filtered; the filtrate, which is slightly yellow, is concentrated under vacuo to 40–50 cc., filtered two or three times through a small quantity of decolorizing carbon until the traces of yellow colour disappear; then evaporated to dryness under vacuo, treated with hot absolute alcohol, filtered if necessary and precipitated with anhydrous ether. Thus murexine chloride hydrochloride monohydrate is obtained with more than 90% yield, microcrystalline white powder, M. P. 218–221° C.

We claim:

1. The process which comprises treating the 2-chloroethyl ester of α-chloro-β(imidoazolyl-4(5))propionic acid with trimethylamine in solution in the presence of at least one apolar solvent, in hot condition and under stirring, in a hermetically closed vessel, to obtain murexine chloride,

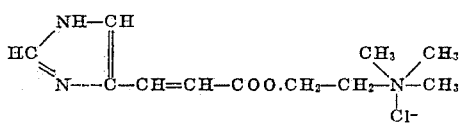

2. The process which comprises treating the 2-chloroethyl ester of α-chloro-β(imidoazolyl-4(5))propionic acid with trimethylamine in solution in the presence of at least one apolar solvent, in hot condition and under stirring, in a hermetically closed vessel, to obtain murexine chloride;

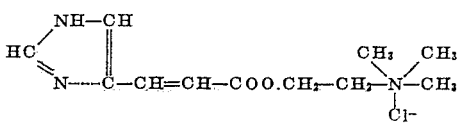

evaporating the reaction liquid; treating the residue with water, filtering if needed, treating with an acid precipitating base, to obtain the corresponding salt of murexine, sparingly soluble in the cold.

3. The process which comprises treating the 2-chloroethyl ester of α-chloro-β(imidoazolyl-4(5))propionic acid with trimethylamine in solution in the presence of at least one apolar solvent, in hot condition and under stirring, in a hermetically closed vessel, to obtain murexine chloride

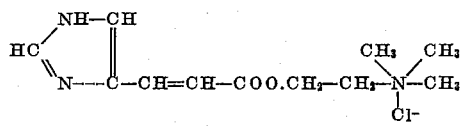

evaporating the reaction liquid; treating the residue with water, filtering if needed, treating with an acid precipitating base, to obtain the corresponding salt of murexine, sparingly soluble in the cold; treating this salt in hot aqueous solution with the corresponding stoichiometric quantity of the hydrochloride of a cationic detergent, to obtain by double exchange an aqueous solution containing exclusively murexine chloride-hydrochloride, and isolating the latter by evaporating to dryness.

4. The process which comprises treating the 2-chloroethyl ester of α-chloro-β(imidoazolyl-4(5))propionic acid with trimethylamine in solution in the presence of at least one apolar solvent, in hot condition and under stirring in a hermetically closed vessel to obtain murexine chloride,

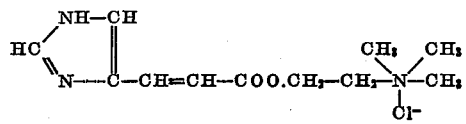

evaporating the reaction liquid, treating the residue with water, filtering if needed, treating with picric acid to obtain murexine dipicrate, sparingly soluble in water, treating said murexine dipicrate in hot aqueous solution with a stoichiometric amount of 2,4-diguanidine phenyl-lauryl ether dihydrochloride to obtain, by means of a double exchange, an aqueous solution containing murexine chloride-hydrochloride only, and isolating the latter by evaporating to dryness.

References Cited in the file of this patent

Erspamer et al., Chem. Abst., vol. 41, col. 1718 (1947).
Erspamer, Chem. Abst., vol. 42, cols. 7431–2 (1948).
Pasini et al., Liebigs Ann., vol. 578, pp. 6–10 (1952).
Pasini et al., Chem. Abst., vol. 47, cols. 5398–9 (1953).
Edelbacher et al., Chem. Abst., vol. 37, col. 5404 (1943).